(12) United States Patent
Vaughn et al.

(10) Patent No.: US 11,521,493 B2
(45) Date of Patent: Dec. 6, 2022

(54) SYSTEMS, METHODS AND APPARATUS FOR DETERMINING PREDICTIVE THREAT VECTORS IN AUTONOMOUS VEHICLE GROUPS

(71) Applicant: Intel Corporation, Santa Clara, CA (US)

(72) Inventors: Robert Vaughn, Portland, OR (US); Timothy Gresham, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/038,012

(22) Filed: Jul. 17, 2018

(65) Prior Publication Data

US 2019/0051180 A1    Feb. 14, 2019

(51) Int. Cl.

| | |
|---|---|
| *G01C 22/00* | (2006.01) |
| *G05D 1/00* | (2006.01) |
| *G08G 1/16* | (2006.01) |
| *G05D 1/02* | (2020.01) |
| *B60W 30/00* | (2006.01) |
| *G08G 1/052* | (2006.01) |
| *G08G 1/04* | (2006.01) |
| *G08G 1/01* | (2006.01) |

(52) U.S. Cl.
CPC ............. *G08G 1/163* (2013.01); *B60W 30/00* (2013.01); *G05D 1/0088* (2013.01); *G05D 1/0214* (2013.01); *G08G 1/166* (2013.01); *G05D 1/0238* (2013.01); *G05D 2201/0212* (2013.01); *G08G 1/0112* (2013.01); *G08G 1/0116* (2013.01); *G08G 1/0141* (2013.01); *G08G 1/04* (2013.01); *G08G 1/052* (2013.01)

(58) Field of Classification Search
CPC ...... G08G 1/163; G08G 1/166; G05D 1/0088; G05D 1/0214; G05D 1/0238; G05D 1/0044; G05D 1/02; G05D 1/00; H04L 29/08
USPC .......................................................... 701/24
See application file for complete search history.

(56) References Cited

U.S. PATENT DOCUMENTS

| | | | |
|---|---|---|---|
| 10,558,224 B1 * | 2/2020 | Lin | G08G 1/165 |
| 10,599,155 B1 | 3/2020 | Konrardy et al. | |
| 2017/0192437 A1 | 7/2017 | Bier et al. | |
| 2019/0011912 A1 * | 1/2019 | Lockwood | G05D 1/0044 |
| 2019/0094859 A1 * | 3/2019 | Nix | G05D 1/0088 |

* cited by examiner

*Primary Examiner* — Mahmoud S Ismail
(74) *Attorney, Agent, or Firm* — Spectrum IP Law Group LLC (57) ABSTRACT

The disclosure generally relates to autonomous or semi-autonomous driving vehicles. An exemplary embodiment of the disclosure relates to a system to provide one or more threat vectors to a cluster of vehicles. An exemplary vehicle detection system includes a communication module configured to receive a first threat vector from a first vehicle in a cluster of vehicles. The first threat vector may include a plurality of primary attributes associated with a moving object. The vehicle detection system may also include a detector module configured to detect the moving object and to provide one or more secondary attributes associated with the moving object; and a controller to construct a second threat vector as a function of one or more of the first threat vector, the primary attributes and the secondary attributes associated with the moving object.

27 Claims, 10 Drawing Sheets

SYSTEMS, METHODS AND APPARATUS FOR DETERMINING PREDICTIVE THREAT VECTORS IN AUTONOMOUS VEHICLE GROUPS

FIELD

The disclosure generally relates to autonomous or semi-autonomous driving vehicles. Specifically, an embodiment of the disclosure relates to dynamic identification and distribution of potential pretention threats among a group of autonomous driving vehicles.

BACKGROUND

Autonomous Driving (AD) vehicles bring a new ecosystem with new requirements on the cloud and the network architecture. Autonomous vehicle systems currently do not provide a capability to work together in quantifying a risk vector from persons, pets and other objects. Such objects may appear proximal to the vehicle and pose a danger. Such objects may be away from the vehicle but may pose danger to subsequent vehicles. There is a need for method, system and apparatus to allow multiple vehicles to cooperatively construct an evolving object threat vector model to mitigate potential vehicle accidents.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Conventional techniques for dynamic compute distribution in autonomous driving (AD) takes place in isolated and static fashion. That is, the vehicle runs some of the compute/analytics, the network edge through mobile or multi-access edge computing (MEC) provides compute capabilities in a standalone manner and the cloud works as an aggregator for long term storage as well as heavy compute and training for machine learning models. The conventional model allows a vehicle to detect danger around the peripheral vehicle vision and act accordingly. If the threat is not immediate (i.e., the object is not moving quickly towards the vehicle), the threat is dismissed. Thus, the conventional autonomous vehicle systems are able to identify objects such as children, pets, etc. that have moved into the path of travel. These systems also leverage a predictive capability where, for example, a person standing on a sidewalk will be identified and characterized with a risk or threat level for accident or injury to either the vehicle or the pedestrian. The conventional techniques, however, are limited to predicting rather immediate risk vectors and not future risk vectors. The disclosed principles advance the state of art by predicting the movement of a threat (i.e., child, dog, etc.) through vector prediction based on known properties of the categorized threat.

Figure 1:
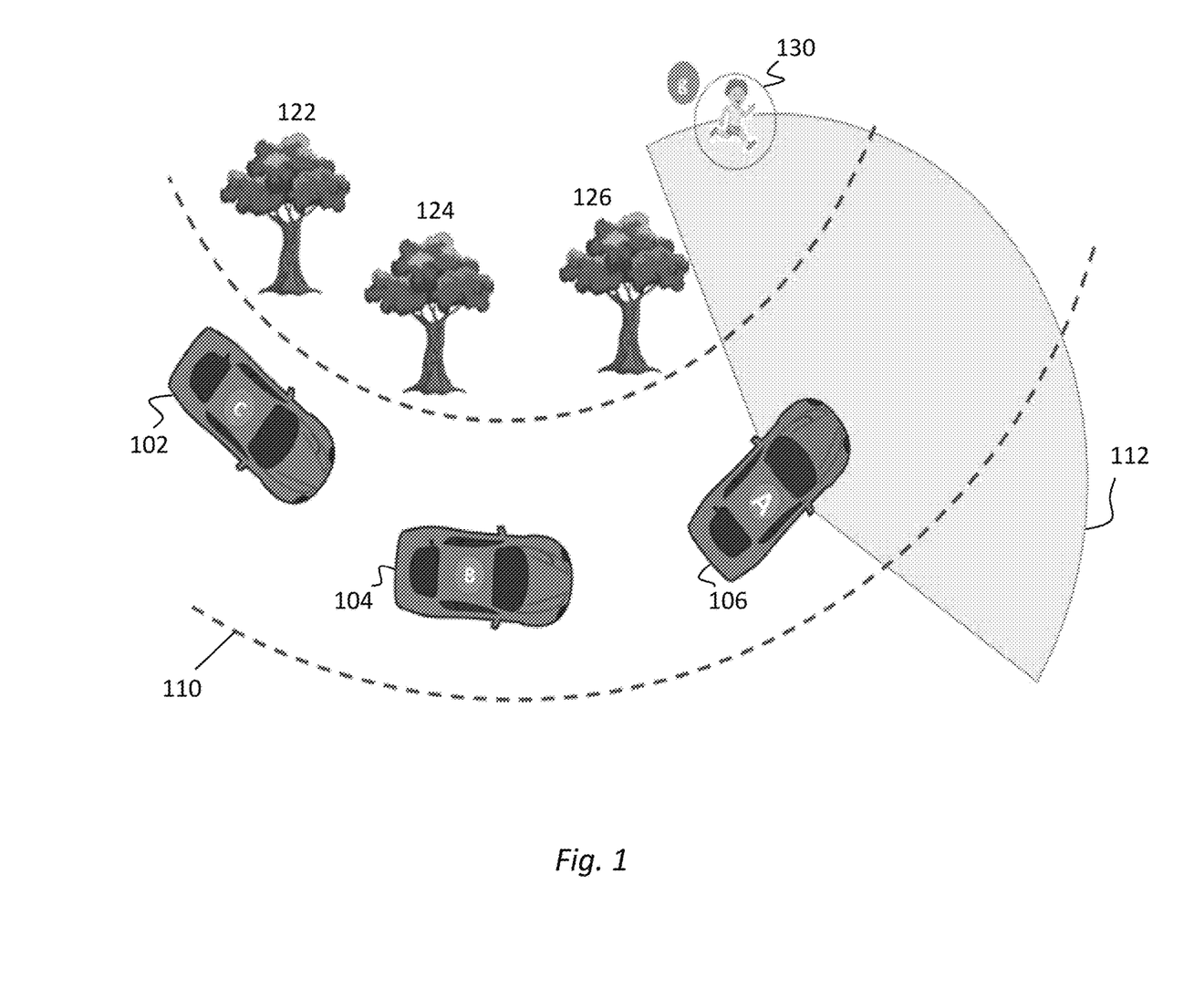
FIG. 1 schematically illustrates the conventional object detection and classification using Light Detection And Ranging ("LIDAR").

FIG. 1 schematically illustrates the conventional object detection and classification using light detection and ranging ("LIDAR"). In FIG. 1, vehicles 102, 104 and 106 are traveling at the same direction on road 110. Stationary objects 122, 124 and 126 are positioned along road 110. Vehicle 106 is equipped with a LIDAR system as schematically indicated by the LIDAR visibility range 112. Vehicles 104 and 102 may have similar detection systems as vehicle 106. Moving object 130 is a child who is moving into the LIDAR range 130. Thus, vehicle 106 is able to detect a child playing along the road. Vehicles 104 and 102 are not able to detect child 130. As a result, vehicles 104 and 102 are at a disadvantage with respect to vehicle 106. Even if vehicle 106 does not deem object 130 a threat vector (given its speed or movement direction), vehicles 104 and 102 may have to make the independent assessments without access to data from vehicle 106's LIDAR.

Figure 2:
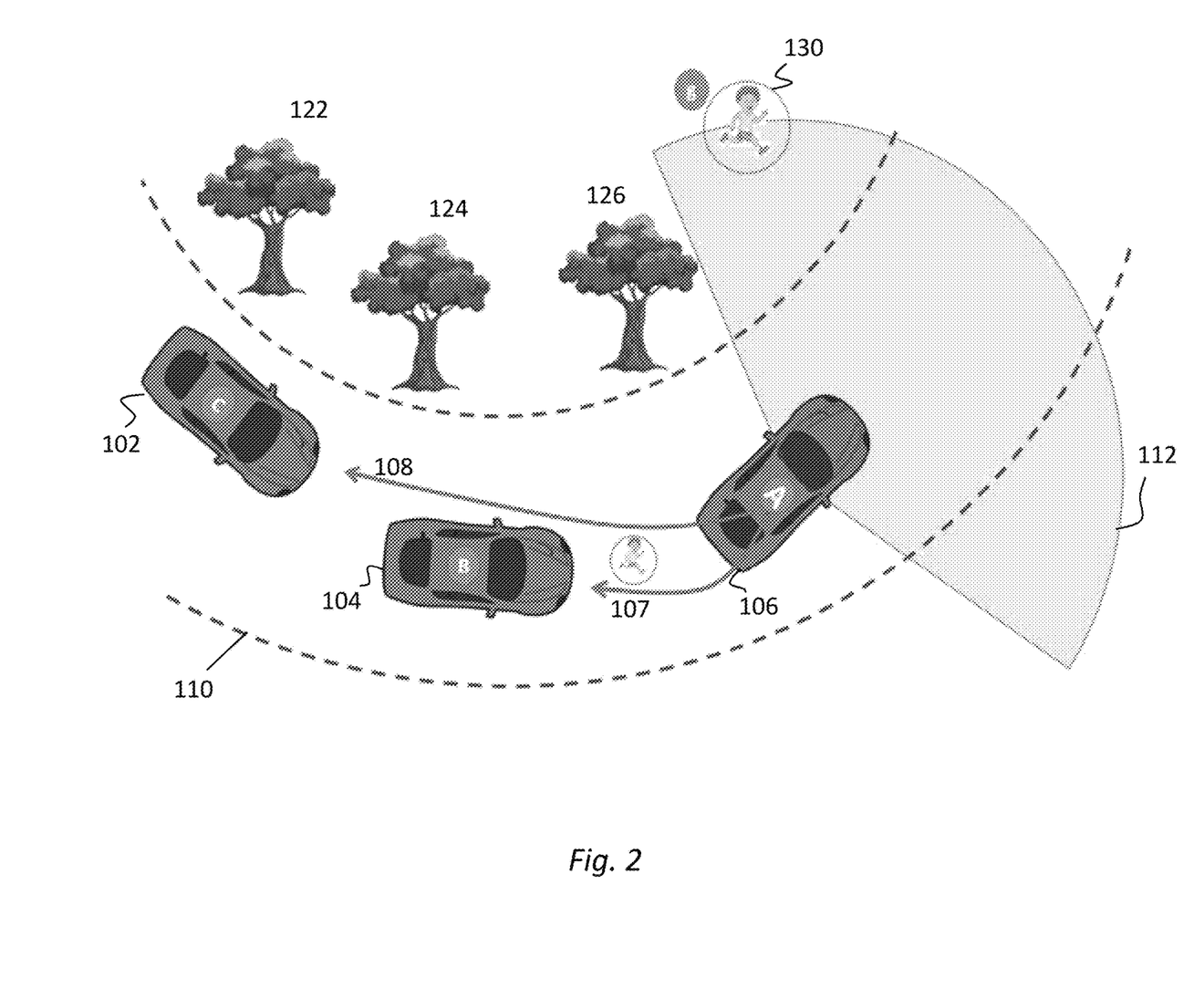
FIG. 2 schematically illustrates an embodiment of the disclosure where vehicle A shares threat information detected within its LIDAR vision with other vehicles.

FIG. 2 schematically illustrates an embodiment of the disclosure where vehicle 106 shares threat information detected within its LIDAR vision with other vehicles. Specifically, vehicle 106 passes the movement information to vehicles 104 and 102 as schematically illustrated by arrows 107 and 108, respectively. In an exemplary embodiment, the threat (including information about moving object 130) may be transmitted to other vehicles (could leverage vehicle to infrastructure (V2I)) using a format such as:

$$\text{Threat}, t=61239847, \text{type}=\text{child}, \text{location}=45.557068,-122.899392, \text{speed}=4.460 \text{ mps}, \text{direction}=286.32 \text{ deg} \quad (1)$$

In the above exemplary statement, 't' represents a timestamp, 'type' refers to the classification of the identified object and location would be a GPS (or potentially other) description on the object's spatial location. With reference to 'type', the disclosed embodiments leverages known methods of object classification that may include visual identification, LIDAR imaging, etc.

It should be noted that while FIG. 2 illustrates vehicles traveling in the same direction and sharing information, the disclosed principles are not limited thereto. The disclosed principles apply equally to conditions where, for example, vehicle 106 is traveling in a different direction than one or more of vehicles 104 and 102.

Statement (1) defines movement information as a potential treat (e.g., from moving object 130) as a function of its primary attributes and may be communicated to other vehicles in the cluster or to the network infrastructure. Statement (1) shows, by way of example, a threat identification number (t), threat type (child) and threat location (longitude, latitude). The second vehicle may use this information in addition to movement information it detects (i.e., secondary movement information having secondary movement attributes) from the same object, child 130.

In certain embodiments, additional information may be communicated to other vehicles to provide a predictive travel vector. For example, the transmitted information may include:

$$\text{Threat}, t=61239847, \text{type}=\text{child}, \text{location}=45.557068,\\ -122.899392, \text{speed}=4.4604 \text{ mps}, \text{direction}=286.32 \text{ deg} \quad (2)$$

Statement (2) provides a vector, direction and speed. Statement (2) may be considered to be a threat vector. Statement (2) includes the primary attributes which may have been detected by LIDAR or other sensors.

Given the fast sampling rate of a LIDAR (etc.) system additional data may be provided to predict a route. Such communication is exemplified in Statement (3) below:

$$\text{Threat}, t=61239847.1, \text{type}=\text{child}, \text{location}=45.557068,-122.899392, \text{speed}=4.4604 \text{ mps}, \text{direction}=286.32 \text{ deg}$$

$$\text{Threat}, t=61239847.5, \text{type}=\text{child}, \text{location}=45.557072,-122.899393, \text{speed}=4.4604 \text{ mps}, \text{direction}=292.6 \text{ deg}$$

$$\text{Threat}, t=61239848.2, \text{type}=\text{child}, \text{location}=45.557073,-122.899394, \text{speed}=4.4604 \text{ mps}, \text{direction}=294.1 \text{ deg} \quad (3)$$

Statement (3) has threat vector information from Statement (2) as well as movement attributes of Statement (1). Statement (3) shares estimated speed of the moving object (e.g., child 130, FIG. 2) as well as its travel direction—which are known and observable information. Additional information may be shared by the observing vehicle (i.e., FIG. 2, vehicle 106).

Such information may include, for example, the level of perceived threat (e.g., fast moving object or slow moving object). In this manner, the threat vector of Statement 3 may include additional information based on the anticipated or predicted object movement. The predicted threat vector(s) may be shared with other vehicles in the network or with the network infrastructure.

In still another embodiment, the disclosure provides a system to catalog typical performance of motion capabilities of such threat objects as, for example, children (of various sizes), pets (of various sizes), balls, bicycles, etc.

Figure 3:
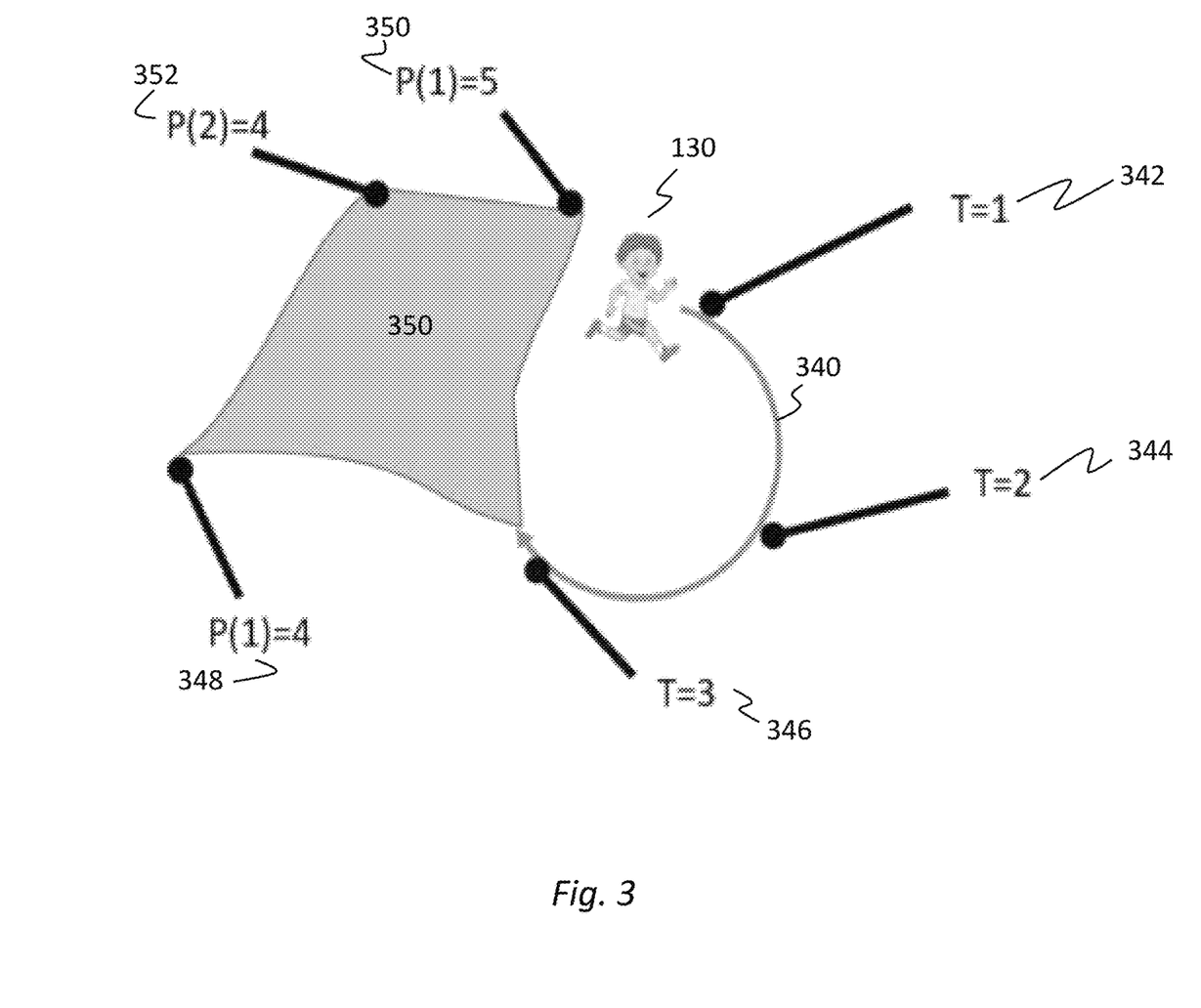
FIG. 3 schematically illustrates an observation technique according to an exemplary embodiment of the disclosure.

FIG. 3 schematically illustrates an observation technique according to an exemplary embodiment of the disclosure. Specifically, FIG. 3 illustrates an exemplary observation made by an observing vehicle (e.g., vehicle 106, FIG. 1). For example, vehicle 106 (FIG. 1) can make several observations of child 130 running near the street. In FIG. 3, line 340 indicates the arc that the child is running along.

In one embodiment, potential travel paths of the moving object may be plotted along travel path 340. In FIG. 3, the object's locations are charted at different points in time (T) to identify a path. For example, at T=1, the child is at location 342; at T=2, the child is at location 344 and at T=3, the child is at location 346. Travel path 340 may be used to predict the object's future travel path. With this information, the algorithm may plot a maximum potential predicted path of travel ($P_{(1 \ldots 3)}(4 \ldots 6)$). For example, one possible prediction would be at P(1)

In FIG. 3, the maximum potential predicted path of travel is indicated as shaded (grey) area 350. For example, predication may be made that object 130 may travel to one of two locations 348 or 350 as the first potential location, P(1). From location P(1), object 130 may go to a second location P(2), which is identified as 352 in FIG. 3.

In one embodiment of the disclosure, machine learning and artificial intelligence may be used to predict movement patterns. In the case of a small child, for example, the machine learning algorithm may assign speed (or range of speed) to the object based on the child's size, age, etc. to further refine its prediction. Predictive algorithm according to certain disclosed embodiments may also consider ambient information, such as, lighting, weather condition or previous pattern in the same or other locations. The predictive models may be used to form a threat vector. In one embodiment, the threat vector may include speed, direction and probability associated with the threat vector.

The predictive information (as well as the past movement observations) may be communicated via known methods to nearby vehicles (e.g., vehicles 104 and 106 of FIG. 1). The communication may be over-the-air communication, for example, by LTE, WiFi or any other conventional communication method as known to an ordinary skill artisan or as described below. The communication may be directly between vehicles, e.g., V2V or from an observing vehicle to the network (cloud or fog) and back to the receiving vehicle(s).

In another embodiment, a receiving vehicle (e.g., vehicle 104, FIG. 1) may receive the observed threat vector(s) and elaborate upon it before passing it down to a subsequent vehicle (e.g., vehicle 102, FIG. 1). In still another embodiment, the predictive information may be stored for future reference or for machine learning and/or training.

Figure 4:
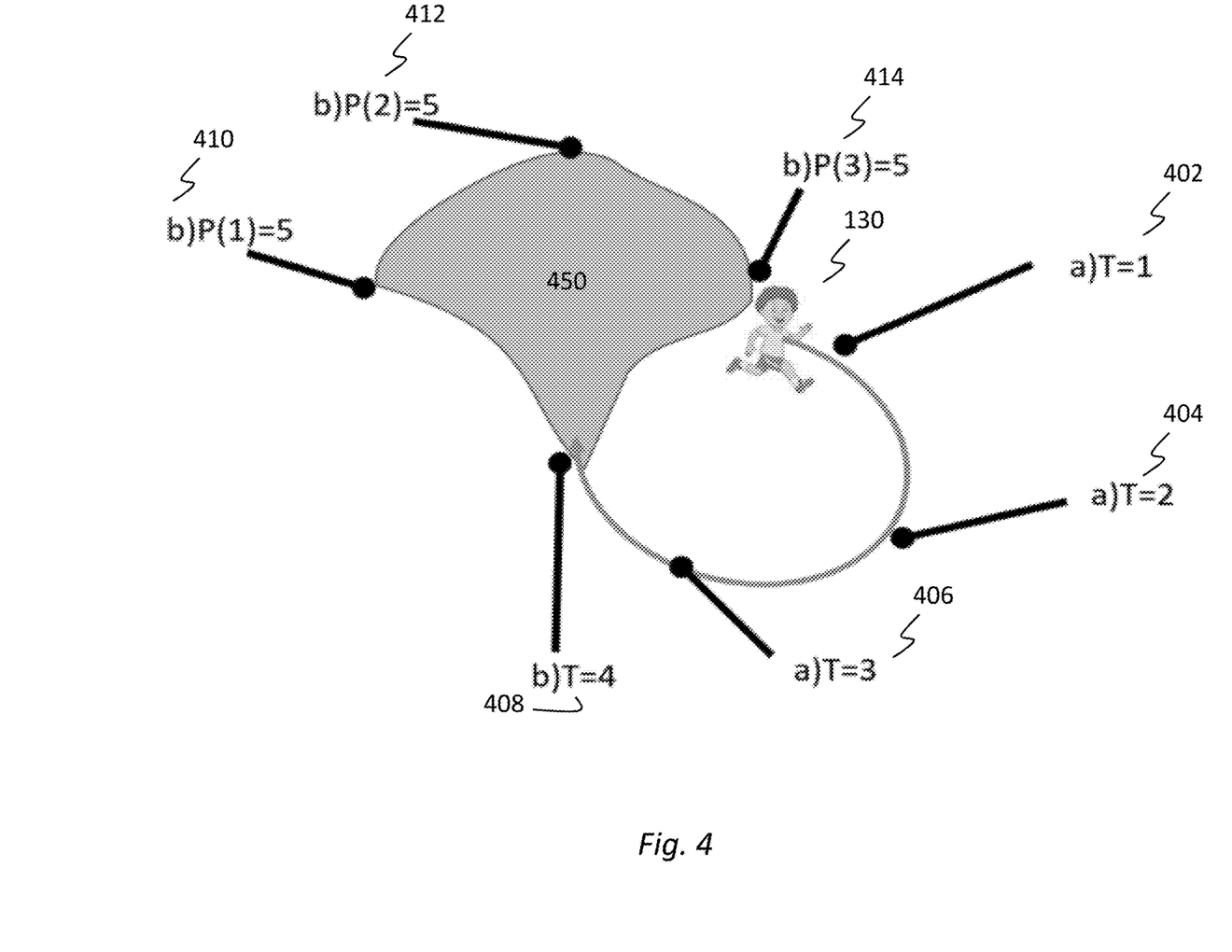
FIG. 4 schematically illustrates an embodiment of the disclosure in which a recipient vehicle further refines the predictive model of FIG. 3.

FIG. 4 schematically illustrates an embodiment of the disclosure in which a recipient vehicle further refines the predictive model of FIG. 3. Specifically, in FIG. 4, past information from FIG. 3 is used to further enhance the predictive model. In FIG. 4, the points received from the first vehicle (i.e., vehicle 106, FIG. 2) are identified as "a". The points received or predicted by the second vehicle (i.e., vehicle 104, FIG. 2) are identified as "b". Thus, points 402, 404 and 406 were obtained by the first vehicle's LIDAR (i.e., vehicle 106, FIG. 2), while points 408, 410 and 412 were predicted by the second vehicle (i.e., vehicle 104, FIG. 2). Area 450 in FIG. 4 is predicted by the second vehicle. It can be seen that area 450 is different in shape and size than are 350 which was predicted by the first vehicle. The difference can be due to additional information received by the second vehicle. For example, the second vehicle has directly observed the moving object's location at point 408 and may use this information to further refine the predictive points 410, 412 and 414. The second vehicle may similarly share this information with other vehicles.

As illustrated in FIG. 4, the second vehicle may elaborate upon the threat observed by the first vehicle. Importantly, the second vehicle will have received the predicted threat vector possibly before the second vehicle can even see the threat. Therefore, the second vehicle may be able to react to the threat with better information. Given the predictive threat and knowledge of the potential movement distance (etc.) capability of the moving threat (i.e., child 130, FIG. 4), then the second vehicle may not need to even slow down. Alternatively, the predictive models may require the vehicle to slow down. A third (or subsequent) vehicle (e.g., vehicle 102, FIG. 1) may also receive the predicted threat vector information from the first and the second vehicles and may act accordingly. In one embodiment, the predictive threat vector makes use of an object capability, available library/catalog of information about such objects and collaborative threat vectoring (obtained from multiple different vehicle sensors) to mitigate risk to vehicle occupants and threat objects. In another embodiment, the system may identify un-cataloged objects through size, motion and physical characteristics. Such a system may be used to identify unexpected or un-invented objects (i.e. robotic hedge trimmer, package delivery drone, etc.) The system can make observations of said characteristics. Subsequent observations could be used to refine the classification of the un-cataloged object. Machine learning and other AI models could be used to refine the characteristics. A network of such systems could then allow for the sharing and improvement of said object's classification.

Figure 5:
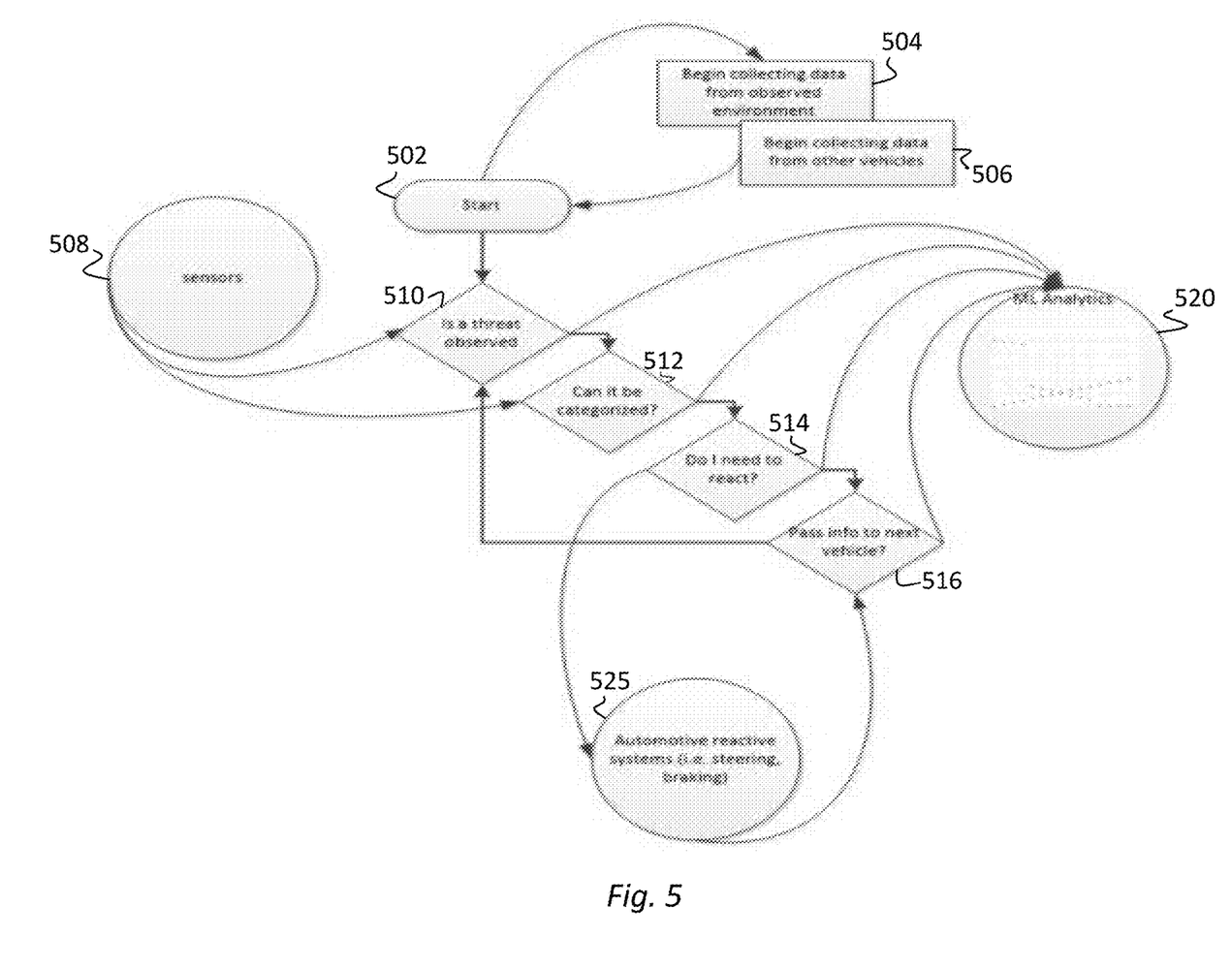
FIG. 5 shows an exemplary flow diagram of a predictive model according to one embodiment of the disclosure.

FIG. 5 shows an exemplary flow diagram of a predictive model according to one embodiment of the disclosure. The flow diagram of FIG. 5 may be implemented at hardware, software or a combination of hardware and software. In one embodiment, the steps of FIG. 5 are implemented on a system-on-chip (SOC) as described below. The information may be stored at a memory circuitry for future applications and reference. The flow diagram may be implementation at a vehicle, a plurality of vehicles or at one or more remote servers. In another embodiment, the computation of the predictive threat vector may be done at the vehicle(s), the network's edge or at one or more data center.

The flow diagram of FIG. 5 specifically illustrates the exemplary embodiment of determining whether to apply braking force (i.e., to slow the vehicle) based on a reaction to a categorized threat.

The process of FIG. 5 starts at step 502, where a vehicle starts collecting data from an observed environment (step 504) by the primary vehicle. Data collection may be done with LIDAR, RADAR or any other sensors configured for autonomous, semi-autonomous or non-autonomous driving. At step 506, data is collected from other vehicles. The other vehicles may be secondary or tertiary vehicles that are proximal to the environment. Such vehicles may have different field of view (FOV) from the primary vehicle or they may have the same FOV with the same or different perspective.

Additional data may be collected by external sensors 508 and directed to one or more control circuitries to implement the flow diagram. At step 510 a decision is made as to whether a threat is observed. If no threat is observed, the process ends. If a threat is observed, the process moves to step 512 while the results of the observation are reported to ML Analytics 520.

At step 512, a determination is made as to whether the threat may be categorized. Here, the input from sensor 508 may also be considered as additional (or updated) data. If the threat my not be categorized, then the process ends.

At step 514, a determination is made as to whether the vehicle needs to react. If the vehicle needs to react, for example, by stopping or slowing its speed, steps are taken to implement these changes as shown in step 525. Specifically, at step 525, the vehicle's reactive system such as steering or breaking may be engaged to avert a threat vector identified as steps 510-514.

At step 516, the information a determination is made as to whether to share the information other vehicles (e.g., the next vehicle.) In one embodiment, the automotive response information 525 is also received at step 516 and shared with other vehicles. Thereafter, the process returns to step 510 where the decision loop is repeated. It should be noted that the decision loop may return to step 510 at any point and that the completion of steps 510-516 are not necessary prior to returning to step 510. It should also be noted that information may be continually directed to ML Analytics 520 for continual monitoring, recording and decision making.

Figure 6:
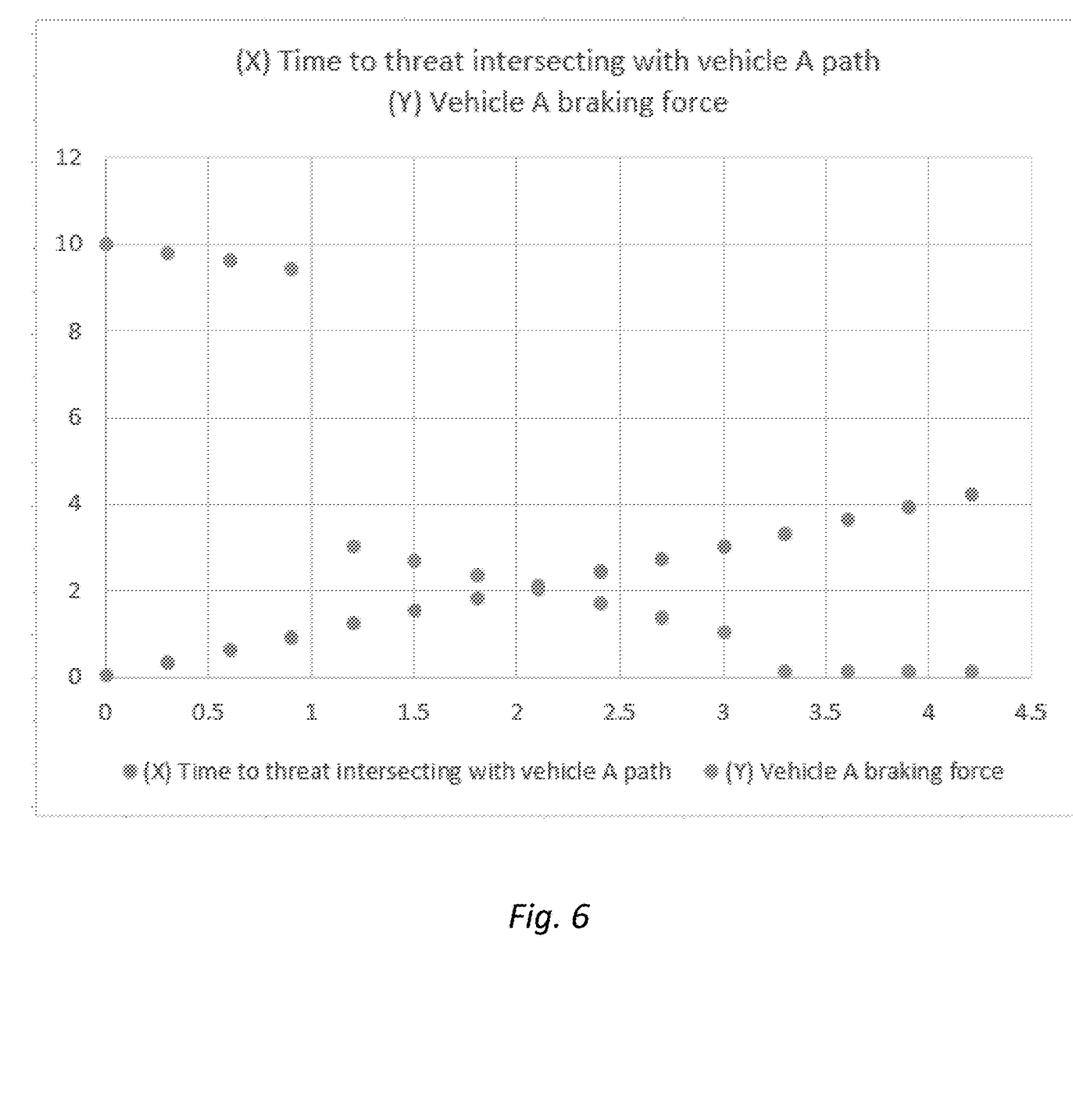
FIG. 6 illustrates an exemplary implementation of the flow diagram of FIG. 5 in which the system reacts to a perceived threat.

FIG. 6 illustrates an exemplary implementation of the flow diagram of FIG. 5 in which the system reacts to a perceived threat. Specifically, the plot of FIG. 6 provides an example of how the system may react to a categorized threat. The X-axis of FIG. 6 shows time to threat; that is, the expected time to collide with object. The Y-axis shows the vehicle's anticipated braking force. This data may be determined and dictated by the automotive's reactive system 525 as shown in FIG. 5. In this example, the vehicle has determined to apply braking force for this threat but only when the threat has a predicted intersect with a given amount of time.

The flow diagram of FIG. 5 may be implemented at a processor. The processor may be an actual processor (hardware) or a virtual processor (software) or a combination of an actual and virtual processor (firmware).

Figure 7:
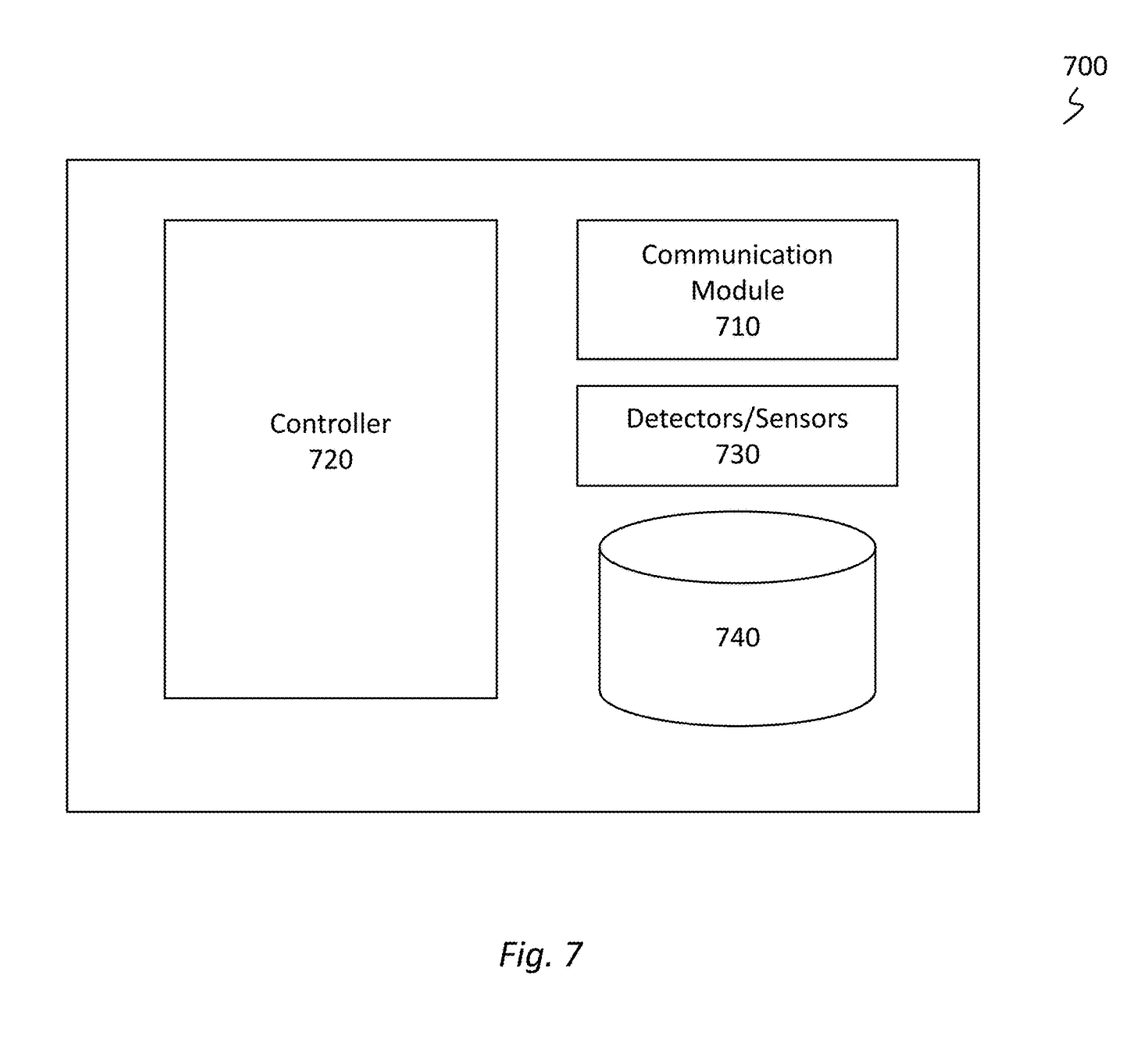
FIG. 7 shows an exemplary system for implementing an embodiment of the disclosure.

FIG. 7 shows an exemplary system for implementing an embodiment of the disclosure. In FIG. 7, system 700 may comprise hardware, software or a combination of hardware and software programmed to implement steps disclosed herein, for example, the steps of flow diagram of FIG. 5. In one embodiment, system 700 may comprise an Artificial Intelligence (AI) CPU. For example, apparatus 700 may be a Machine Learning (ML) node, an MEC node or a DC node. In one exemplary embodiment, system 700 may be implemented at an Autonomous Driving (AD) vehicle. At another exemplary embodiment, system 700 may define an ML node executed external to the vehicle.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

System 700 comprise communication module 710. The communication module may comprise hardware and software configured for landline, wireless and optical communication. For example, communication module 710 may comprise components to conduct wireless communication, including WiFi, 5G, NFC, Bluetooth, Bluetooth Low Energy (BLE) and the like. Controller 720 (interchangeably, micromodule) may comprise processing circuitry required to implement one or more steps illustrates in FIG. 5. Controller 720 may include one or more processor circuitries and memory circuities. Controller 720 may communicate with memory 740. Memory 740 may store one or more tables associated with various threat vectoring. For example, memory 740 may include a table of estimates movement for an adult, a child or an animal. Such information may be retrieved by controller 720 to estimate the likelihood or threat level for a moving object. Moreover, the information in memory 740 may be shared with other AD vehicles or databases.

In certain embodiments, controller 720 may comprise a set of register spaces that record the amount of anticipated resources (to encounter a moving object) and the anticipated response time (latency) for the vehicle. As stated, such determination may vary based on the location of the vehicle and the anticipated threat vectoring.

Detectors and/or sensors module 730 may include one or more detectors and one or more sensors configure to obtain information from the environment proximal to the vehicle. This information may be within the vehicle's FOV. The information may include attributes of objects proximal to the vehicle. Such objects may be moving or stationary. The attributes may include threat identification number, category or the type object (e.g., person, animal, building, etc.), location of the object, speed of the object if the object is moving, direction of movement and the observed or estimated speed of the object. A time stamp and other indicia may also be included in the attribute list.

The detectors may include, for example, LIDAR and RADAR detectors or other such means for detecting objects in the vicinity of the vehicle. Sensors may include one or more sensors configured to receive environmental information proximal to the vehicle. It should be noted that detectors/sensors 730 may be integrated with system 700 or may be independent of system 700. For example, one or more portions of the detectors or sensors may be external to the vehicle. Such sensors may communicate, for example, ambient conditions to the vehicle.

Figure 8:
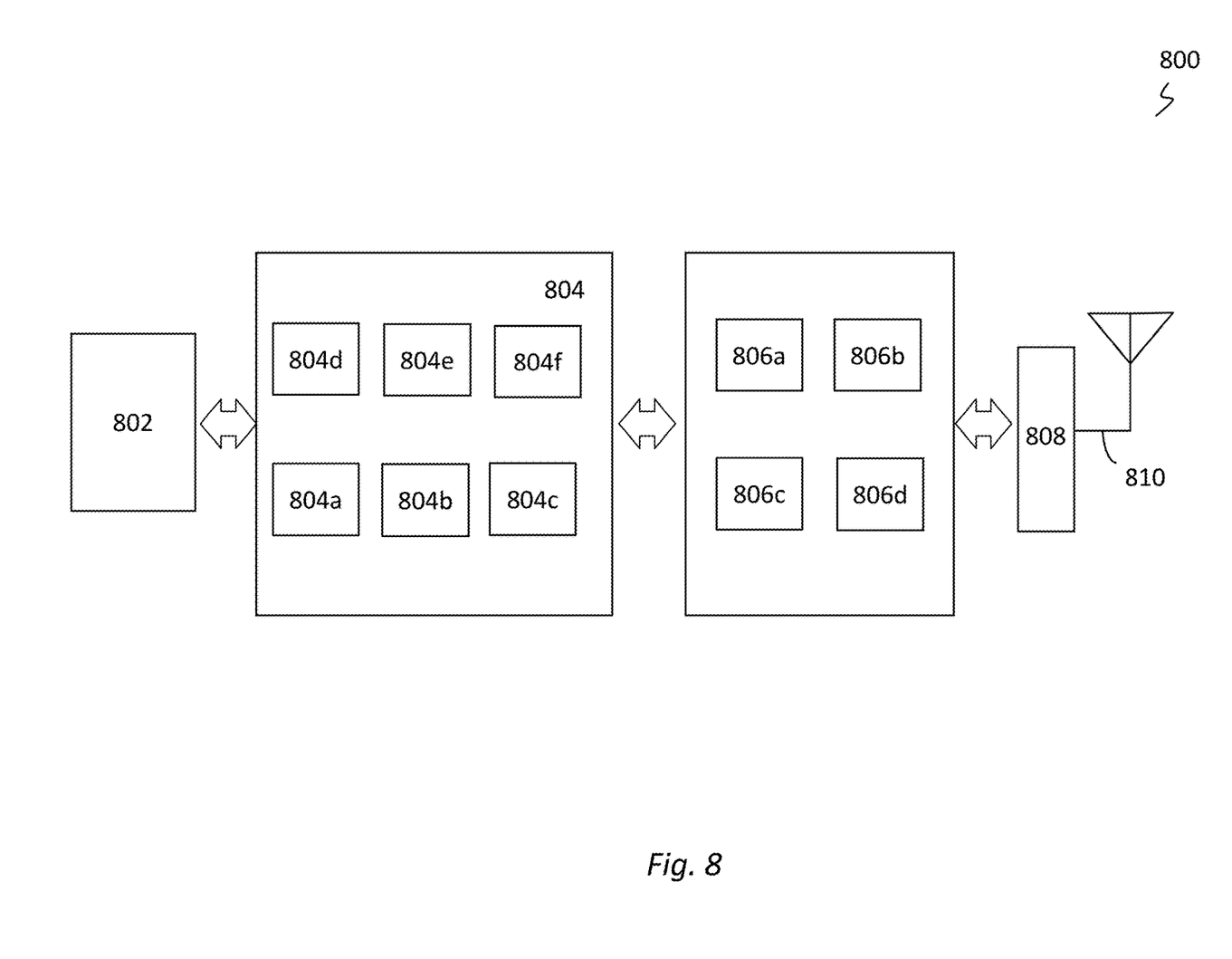
FIG. 8 is a schematic block diagram illustration of components of a communication component in accordance with one or more exemplary embodiments disclosed herein.

FIG. 8 is a schematic block diagram illustration of components of a communication component in accordance with one or more exemplary embodiments disclosed herein. Specifically, FIG. 8 may represent a component of a wireless device as used in the system 700 of FIG. 7. Communication component 800 may be used for landline or wireless communication. Component 800 may include application circuitry 802, baseband circuitry 804, Radio Frequency (RF) circuitry 806, front-end module (FEM) circuitry 808 and one or more antennas 810, coupled together at least as shown.

Application circuitry 802 may include one or more application processors. For example, application circuitry 802 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 804 may include circuitry such as, but not limited to, one or more single-core or multi-core processors. Baseband circuitry 804 may include one or more baseband processors and/or control logic to process baseband signals received from a receive signal path of RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (MG) baseband processor 804a, third generation (3G) baseband processor 804b, fourth generation (4G) baseband processor 804c, and/or one or more other baseband processors 804d for other existing generations, generations in development or to be developed in the future, for example fifth generation (5G), sixth generation (6G), and so on. Baseband circuitry 804, for example one or more of baseband processors 804a through 804d, may handle various radio control functions that enable communication with one or more radio networks via RF circuitry 806. The radio control functions may include, but are not limited to, signal modulation and/or demodulation, encoding and/or decoding, radio frequency shifting, and so on. In some embodiments, modulation and/or demodulation circuitry of baseband circuitry 804 may include Fast-Fourier Transform (FFT), precoding, and/or constellation mapping and/or demapping functionality. In some embodiments, encoding and/or decoding circuitry of baseband circuitry 804 may include convolution, tail-biting convolution, turbo, Viterbi, and/or LowDensity Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or Radio Resource Control (RRC) elements. Processor 804e of the baseband circuitry 704 may be configured to run elements of the protocol stack for signaling of the PHY, MAC, RLC, PDCP and/or RRC layers. In some embodiments, the baseband circuitry may include one or more audio digital signal processors (DSP) 804f. The one or more audio DSPs 804f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 804 and application circuitry 802 may be implemented together such as, for example, on a system on a chip (SOC).

In some embodiments, baseband circuitry 804 may provide for communication compatible with one or more radio technologies. For example, in some embodiments, baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, RF circuitry 806 may include switches, filters, amplifiers, and so on, to facilitate the communication with the wireless network. RF circuitry 806 may include a receive signal path which may include circuitry to down-convert RF signals received from FEM circuitry 808 and provide baseband signals to baseband circuitry 804. RF circuitry 806 may also include a transmit signal path which may include circuitry to up-convert baseband signals provided by the baseband circuitry 804 and provide RF output signals to FEM circuitry 808 for transmission.

In some embodiments, RF circuitry 806 may include a receive signal path and a transmit signal path. The receive signal path of RF circuitry 806 may include mixer circuitry 806a, amplifier circuitry 806b and filter circuitry 806c. The transmit signal path of RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from FEM circuitry 808 based on the synthesized frequency provided by synthesizer circuitry 806d. Amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, mixer circuitry 806a of the transmit signal path may be configured to up-convert input baseband signals based on the synthesized frequency provided by synthesizer circuitry 806d to generate RF output signals for FEM circuitry 808. The baseband signals may be provided by the baseband circuitry 804 and may be filtered by filter circuitry 806c. Filter circuitry 806c may include a low-pass filter (LPF), although the scope of the embodiments is not limited in this respect.

In some embodiments, mixer circuitry 806a of the receive signal path and the mixer circuitry 806a of the transmit signal path may include two or more mixers and may be arranged for quadrature down conversion and/or up conversion respectively. In some embodiments, mixer circuitry 806a of the receive signal path and the mixer circuitry 806a of the transmit signal path may include two or more mixers and may be arranged for image rejection, for example Hartley image rejection. In some embodiments, mixer circuitry 806a of the receive signal path and the mixer circuitry 806a may be arranged for direct down conversion and/or direct up conversion, respectively. In some embodiments, mixer circuitry 806a of the receive signal path and mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 806 may include analog-to-digital converter (ADC) and digital-to-analog converter (DAC) circuitry, and baseband circuitry 804 may include a digital baseband interface to communicate with RF circuitry 806. In some dual-mode embodiments, separate radio integrated circuit (IC) circuitry may be provided for processing signals for one or more spectra, although the scope of the embodiments is not limited in this respect.

In some embodiments, synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

Synthesizer circuitry 806d may be configured to synthesize an output frequency for use by mixer circuitry 806a of RF circuitry 806 based on a frequency input and a divider control input. In some embodiments, synthesizer circuitry 806d may be a fractional N/N+1 synthesizer.

In some embodiments, frequency input may be provided by a voltage controlled oscillator (VCO), although that is not a requirement. Divider control input may be provided by either baseband circuitry 804 or applications processor 802 depending on the desired output frequency. In some embodiments, a divider control input (e.g., N) may be determined from a look-up table based on a channel indicated by applications processor 802.

Synthesizer circuitry 806d of RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by RF circuitry 806 for transmission by one or more of the one or more antennas 810.

In some embodiments, FEM circuitry 808 may include a transmit/receive (TX/RX) switch to switch between transmit mode and receive mode operation. FEM circuitry 808 may include a receive signal path and a transmit signal path. The receive signal path of FEM circuitry 808 may include a low-noise amplifier (LNA) to amplify received RF signals and to provide the amplified received RF signals as an output, for example to RF circuitry 806. The transmit signal path of FEM circuitry 808 may include a power amplifier (PA) to amplify input RF signals, for example provided by RF circuitry 806, and one or more filters to generate RF signals for subsequent transmission, for example by one or more of antennas 810. In some embodiments, UE device 800 may include additional elements such as, for example, memory and/or storage, display, camera, sensor, and/or input/output (I/O) interface, although the scope of the claimed subject matter is not limited in this respect.

Furthermore, some embodiments may be applied in computing devices that include one or more processors (e.g., with one or more processor cores), such as those discussed with reference to disclosed FIGS. herein, including for example, small form factor or mobile computing devices, e.g., an IoT device, M2M device, a smartphone, tablet, UMPC (Ultra-Mobile Personal Computer), laptop computer, Ultrabook™ computing device, wearable devices (such as a smart watch, smart glasses, etc.), 2 in 1 systems, etc. However, embodiments discussed herein are not limited to mobile computing devices and may be applied in any type of computing device, such as a work station, a server, a super computer, etc. Also, some embodiments are applied in computing devices that include a cooling fan as well as fanless computing devices.

In some embodiments, an IoT device may be utilized. An IoT device may include various components (such as one or more components discussed with reference to the disclosed figures). Also, one or more embodiments may utilize a computing cloud (or more generally a "cloud"). The computing cloud may include various types of computing devices. These devices may be in digital communication via a cellular communication channel, a computer network, and/or the Internet. Also, one or more of the components discussed herein can be embodied as a System-On-Chip (SOC) device.

Figure 9:
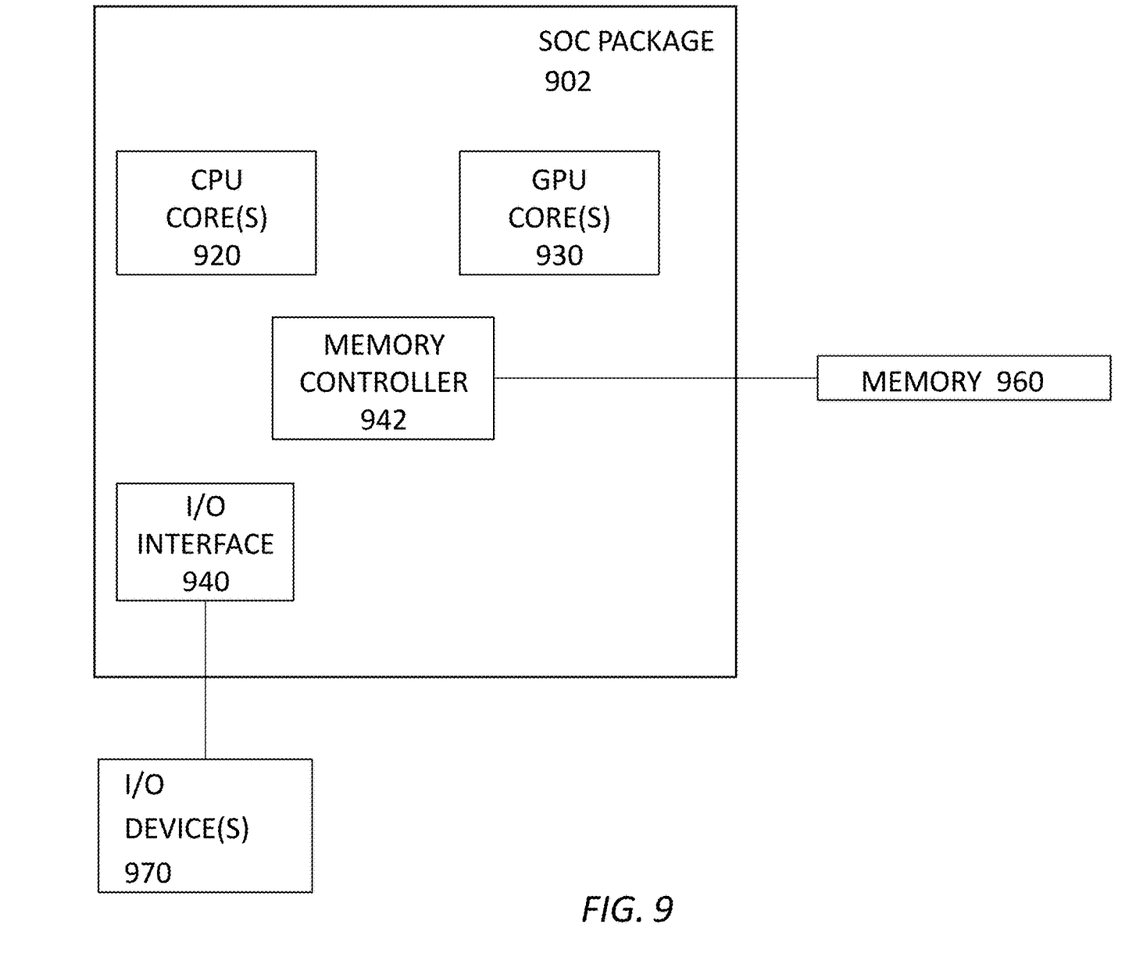
FIG. 9 illustrates a block diagram of an SOC package in accordance with an embodiment.

FIG. 9 illustrates a block diagram of an SOC package in accordance with an embodiment. As illustrated in FIG. 9, SOC 802 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 920 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
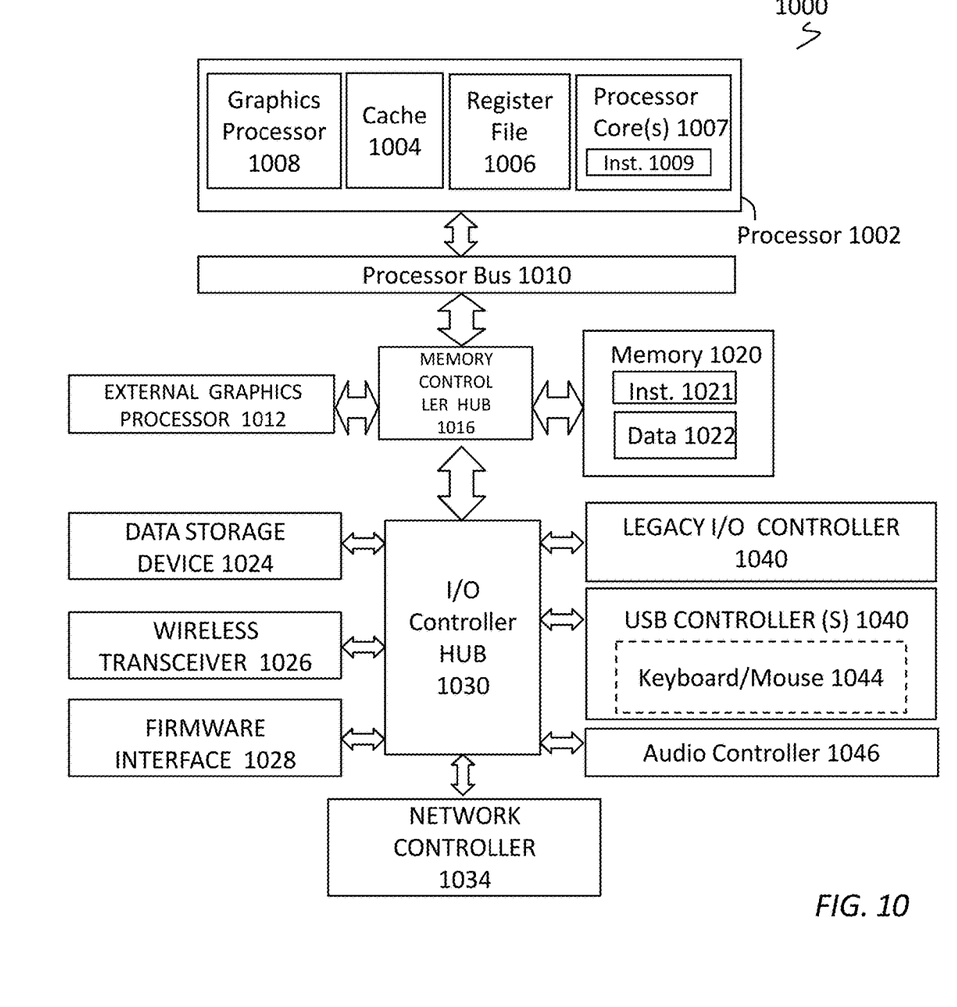
FIG. 10 is a block diagram of a processing system 1000, according to an embodiment of the disclosure.

FIG. 10 is a block diagram of a processing system 1000, according to an embodiment. In various embodiments the system 1000 includes one or more processors 1002 and one or more graphics processors 1008, and may be a single processor desktop system, a multiprocessor workstation system, or a server system having a large number of processors 1002 or processor cores 1007. In on embodiment, the system 1000 is a processing platform incorporated within a system-on-a-chip (SoC or SOC) integrated circuit for use in mobile, handheld, or embedded devices.

An embodiment of system 1000 can include, or be incorporated within a server-based gaming platform, a game console, including a game and media console, a mobile gaming console, a handheld game console, or an online game console. In some embodiments system 1000 is a mobile phone, smart phone, tablet computing device or mobile Internet device. Data processing system 1000 can also include, couple with, or be integrated within a wearable device, such as a smart watch wearable device, smart eyewear device, augmented reality device, or virtual reality device. In some embodiments, data processing system 1000 is a television or set top box device having one or more processors 1002 and a graphical interface generated by one or more graphics processors 1008.

In some embodiments, the one or more processors 1002 each include one or more processor cores 1007 to process instructions which, when executed, perform operations for system and user software. In some embodiments, each of the one or more processor cores 1007 is configured to process a specific instruction set 1009. In some embodiments, instruction set 1009 may facilitate Complex Instruction Set Computing (CISC), Reduced Instruction Set Computing (RISC), or computing via a Very Long Instruction Word (VLIW). Multiple processor cores 1007 may each process a different instruction set 1009, which may include instructions to facilitate the emulation of other instruction sets. Processor core 1007 may also include other processing devices, such a Digital Signal Processor (DSP).

In some embodiments, the processor 1002 includes cache memory 1004. Depending on the architecture, the processor 1002 can have a single internal cache or multiple levels of internal cache. In some embodiments, the cache memory is shared among various components of the processor 1002. In some embodiments, the processor 1002 also uses an external cache (e.g., a Level-3 (L3) cache or Last Level Cache (LLC)) (not shown), which may be shared among processor cores 1007 using known cache coherency techniques. A register file 1006 is additionally included in processor 1002 which may include different types of registers for storing different types of data (e.g., integer registers, floating point registers, status registers, and an instruction pointer register). Some registers may be general-purpose registers, while other registers may be specific to the design of the processor 1002.

In some embodiments, processor 1002 is coupled to a processor bus 1010 to transmit communication signals such as address, data, or control signals between processor 1002 and other components in system 1000. In one embodiment the system 1000 uses an exemplary 'hub' system architecture, including a memory controller hub 1016 and an Input Output (I/O) controller hub 1030. A memory controller hub 1016 facilitates communication between a memory device and other components of system 1000, while an I/O Controller Hub (ICH) 1030 provides connections to I/O devices via a local I/O bus. In one embodiment, the logic of the memory controller hub 1016 is integrated within the processor.

Memory device 1020 can be a dynamic random access memory (DRAM) device, a static random access memory (SRAM) device, flash memory device, phase-change memory device, or some other memory device having suitable performance to serve as process memory. In one embodiment the memory device 1020 can operate as system memory for the system 1000, to store data 1022 and instructions 1021 for use when the one or more processors 1002 executes an application or process. Memory controller hub 1016 also couples with an optional external graphics processor 1012, which may communicate with the one or more graphics processors 1008 in processors 1002 to perform graphics and media operations.

In some embodiments, ICH 1030 enables peripherals to connect to memory device 1020 and processor 1002 via a high-speed I/O bus. The I/O peripherals include, but are not limited to, an audio controller 1046, a firmware interface 1028, a wireless transceiver 1026 (e.g., Wi-Fi, Bluetooth), a data storage device 1024 (e.g., hard disk drive, flash memory, etc.), and a legacy I/O controller 1040 for coupling legacy (e.g., Personal System 2 (PS/2)) devices to the system. One or more Universal Serial Bus (USB) controllers 1042 connect input devices, such as keyboard and mouse 1044 combinations. A network controller 1034 may also couple to ICH 1030. In some embodiments, a high-performance network controller (not shown) couples to processor bus 1010. It will be appreciated that the system 1000 shown is exemplary and not limiting, as other types of data processing systems that are differently configured may also be used. For example, the I/O controller hub 1030 may be integrated within the one or more processor 1002, or the memory controller hub 1016 and I/O controller hub 1030 may be integrated into a discreet external graphics processor, such as the external graphics processor 1012.

ADDITIONAL NOTES & EXAMPLES

The following embodiments are provided to further illustrate different exemplary and non-limiting embodiments of the disclosure.

Example 1 relates to a system to provide one or more threat vectors to a cluster of vehicles, the system comprising: a communication module configured to receive a first threat vector from a first vehicle in the cluster of vehicles, the threat vector including a plurality of primary attributes associated with a moving object; a detector module configured to detect the moving object and to provide one or more secondary attributes associated with the moving object; and a controller to construct a second threat vector as a function of one or more of the first threat vector, the primary attributes and the secondary attributes associated with the moving object; wherein the communication module is further configured to communicate at second threat vector to the cluster of vehicles expected to encounter the moving object and wherein at least one of the first threat vector or the second threat vector comprises at least one predicted location for the moving object.

Example 2 relates to the system of Example 1, wherein the communication module, the detector and the controller are associated with the second vehicle in the cluster of vehicles.

Example 3 relates to the system of Example 1, wherein the communication modules is configured to communicate with one or more vehicles in the cluster and with a network infrastructure.

Example 4 relates to the system of Example 1, wherein the detector module is configured to detect the moving object's secondary attributes when the moving object is within detection range of the second vehicle.

Example 5 relates to the system of Example 1, wherein at least one of the of the first threat vector or the second threat vectors comprises an estimated further location for the moving object as a function of the moving object's characteristic.

Example 6 relates to the system of Example 1, further comprising a sensor module to sense real-time ambient conditions.

Example 7 relates to the system of Example 1, further comprising a memory module to store information for the moving object.

Example 8 relates to the system of Example 1, wherein the controller is configured to identify the second threat vector as one of actionable or non-actionable for the second vehicle.

Example 9 relates to the system of Example 1, wherein the primary or the secondary attributes further comprise one or more of threat identification number, type of the first moving object, location of the first moving object, direction of movement of the first moving object and an estimated or observed speed of the first moving object.

Example 10 relates to at least one machine-readable medium including instructions to provide one or more threat vectors to a cluster of vehicles, which when executed, causes one or more processors to implement steps comprising: identifying a cluster of vehicles approaching a first location, the cluster of vehicles including a first vehicle and a second vehicle; obtaining a first movement data associated with a moving object at the first vehicle, the first movement data comprising one or more primary attributes; constructing a first threat vector as a function of the one or more primary attributes associated with the moving object; communicating the first threat vector to the second vehicle of the cluster of vehicles approaching the first location; obtaining a second movement data associated with the moving object at the second vehicle, the second movement data comprising one or more secondary attributes; and constructing a second threat vector as a function of the one or more primary and secondary attributes.

Example 11 relates to the medium of Example 10, wherein the threat vector further comprises a predicted movement pattern for the moving object.

Example 12 relates to the medium of Example 10, further comprising receiving sensor data associated with the first location, the sensor data comprising real-time ambient information at the first location.

Example 13 relates to the medium of Example 12, wherein the sensor data is received from one or more of the first vehicle, the second vehicle or an infrastructure.

Example 14 relates to the medium of Example 10, further comprising categorizing the first threat vector as one of actionable or non-actionable for the first vehicle.

Example 15 relates to the medium of Example 10, wherein the step of communicating the first threat vector further comprises communicating the first threat vector and the one or more primary attributes to the second vehicle.

Example 16 relates to the medium of Example 10, wherein the primary attributes further comprise one or more of threat identification number, type of the first moving object, location of the first moving object, direction of movement of the first moving object and an estimated or observed speed of the first moving object.

Example 17 relates to the medium of Example 10, further comprising communicating the first and the second threat vectors to at least a third vehicle in the cluster of vehicles.

Example 18 relates to the medium of Example 10, wherein the cluster of vehicles comprises a plurality of vehicles approaching the first location during a first time interval.

Example 19 relates to a method to provide one or more threat vectors to a cluster of vehicles, the method comprising: identifying a cluster of vehicles approaching a first location, the cluster of vehicles including a first vehicle and a second vehicle; obtaining a first movement data associated with a moving object at the first vehicle, the first movement data comprising one or more primary attributes; constructing a first threat vector as a function of the one or more primary attributes associated with the moving object; communicating the first threat vector to the second vehicle of the cluster of vehicles approaching the first location, communicating the threat vector from the first or second or other vehicle to other vehicles within the cluster of vehicles that may approach the first location; obtaining a second movement data associated with the moving object at the second vehicle, the second movement data comprising one or more secondary attributes, and constructing a second threat vector as a function of the one or more primary and secondary attributes.

Example 20 relates to the method of Example 19, wherein the threat vector further comprises a predicted movement pattern for the moving object.

Example 21 relates to the method of Example 19, further comprising receiving sensor data associated with the first location, the sensor data comprising real-time ambient information at the first location.

Example 22 relates to the method of Example 21, wherein the sensor data is received from one or more of the first vehicle, the second vehicle or an infrastructure.

Example 23 relates to the method of Example 19, further comprising categorizing the first threat vector as one of actionable or non-actionable for the first vehicle.

Example 24 relates to the method of Example 19, wherein the step of communicating the first threat vector further comprises communicating the first threat vector and the one or more primary attributes to the second vehicle.

Example 25 relates to the method of Example 19, wherein the primary attributes further comprise one or more of threat identification number, type of the first moving object, location of the first moving object, direction of movement of the first moving object and an estimated or observed speed of the first moving object.

Example 26 relates to the method of Example 19, further comprising communicating the first and the second threat vectors to at least a third vehicle in the cluster of vehicles.

Example 27 relates to the method of Example 19, wherein the cluster of vehicles comprises a plurality of vehicles approaching the first location during a first time interval.

While the principles of the disclosure have been illustrated in relation to the exemplary embodiments shown herein, the principles of the disclosure are not limited thereto and include any modification, variation or permutation thereof.

What is claimed is:

1. A system to provide one or more threat vectors to a cluster of vehicles, the system comprising:
    a communication module configured to receive a first threat vector from a first vehicle in the cluster of vehicles, the first threat vector including a plurality of primary attributes associated with a moving object;
    a detector module configured to detect the moving object and to provide one or more secondary attributes associated with the moving object; and
    a controller module to construct a second threat vector as a function of one or more of the first threat vector, the primary attributes and the secondary attributes associated with the moving object;
    wherein the communication module is further configured to communicate a second threat vector to the cluster of vehicles expected to encounter the moving object and wherein each of the first threat vector and the second threat vectors comprise one or more predicted locations for the moving object;
    wherein a second vehicle in the cluster of vehicles elaborates on the first threat vector from the first vehicle;
    wherein the each of the first and the second threat vectors predicts location of the moving object as a function of the available information relating to the moving object at respective times.

2. The system of claim 1, wherein the communication module, the detector and the controller are associated with a second vehicle in the cluster of vehicles.

3. The system of claim 1, wherein the communication modules are configured to communicate with one or more vehicles in the cluster and with a network infrastructure.

4. The system of claim 1, wherein the detector module is configured to detect the moving object's secondary attributes when the moving object is within detection range of a second vehicle.

5. The system of claim 1, wherein at least one of the of the first threat vector or the second threat vectors comprises an estimated further location for the moving object as a function of the moving object's characteristic.

6. The system of claim 1, further comprising a sensor module to sense real-time ambient conditions.

7. The system of claim 1, further comprising a memory module to store information for the moving object.

8. The system of claim 1, wherein the controller is configured to identify the second threat vector as one of actionable or non-actionable for the second vehicle.

9. The system of claim 1, wherein the primary or the secondary attributes further comprise one or more of threat identification number, type of the first moving object, location of the first moving object, direction of movement of the moving object and an estimated or observed speed of the first moving object.

10. At least one, non-transitory, machine-readable medium including instructions to provide one or more threat vectors to a cluster of vehicles, which when executed, causes one or more processors to implement steps comprising:
    identifying a cluster of vehicles approaching a first location, the cluster of vehicles including a first vehicle and a second vehicle;
    obtaining a first movement data associated with a moving object at the first vehicle, the first movement data comprising one or more primary attributes;
    constructing a first threat vector as a function of the one or more primary attributes associated with the moving object;
    communicating the first threat vector to the second vehicle of the cluster of vehicles approaching the first location;
    obtaining a second movement data associated with the moving object at the second vehicle, the second movement data comprising one or more secondary attributes; and
    constructing a second threat vector as a function of the one or more primary and secondary attributes wherein a second vehicle in the cluster of vehicles elaborates on the first threat vector from the first vehicle;
    wherein each of the first and the second threat vectors predict location of the moving object as a function of the available information relating to the moving object at a respective first and a second times.

11. The medium of claim 10, wherein the second threat vector further comprises a predicted movement pattern for the moving object.

12. The medium of claim 10, further comprising receiving sensor data associated with the first location, the sensor data comprising real-time ambient information at the first location.

13. The medium of claim 12, wherein the sensor data is received from one or more of the first vehicle, the second vehicle or an infrastructure.

14. The medium of claim 10, further comprising categorizing the first threat vector as one of actionable or non-actionable for the first vehicle.

15. The medium of claim 10, wherein the step of communicating the first threat vector further comprises communicating the first threat vector and the one or more primary attributes to the second vehicle.

16. The medium of claim 10, wherein the primary attributes further comprise one or more of threat identification number, type of the first moving object, location of the first moving object, direction of movement of the moving object and an estimated or observed speed of the first moving object.

17. The medium of claim 10, further comprising communicating the first and the second threat vectors to at least a third vehicle in the cluster of vehicles.

18. The medium of claim 10, wherein the cluster of vehicles comprises a plurality of vehicles approaching the first location during a first time interval.

19. A method to provide one or more threat vectors to a cluster of vehicles, the method comprising:
- identifying a cluster of vehicles approaching a first location, the cluster of vehicles including a first vehicle and a second vehicle;
- obtaining a first movement data associated with a moving object at the first vehicle, the first movement data comprising one or more primary attributes;
- constructing a first threat vector as a function of the one or more primary attributes associated with the moving object;
- communicating the first threat vector to the second vehicle of the cluster of vehicles approaching the first location;
- communicating the threat vector from the first or second or other vehicle to other vehicles within the cluster of vehicles that may approach the first location;
- obtaining a second movement data associated with the moving object at the second vehicle, the second movement data comprising one or more secondary attributes; and
- at a controller module, constructing a second threat vector as a function of the one or more primary and secondary attributes wherein a second vehicle in the cluster of vehicles elaborates on the first threat vector from the first vehicle;
- wherein each of the first and the second threat vectors predict location of the moving object at a respective first and second times.

20. The method of claim 19, wherein the second threat vector further comprises a predicted movement pattern for the moving object.

21. The method of claim 19, further comprising receiving sensor data associated with the first location, the sensor data comprising real-time ambient information at the first location.

22. The method of claim 21, wherein the sensor data is received from one or more of the first vehicle, the second vehicle or an infrastructure.

23. The method of claim 19, further comprising categorizing the first threat vector as one of actionable or non-actionable for the first vehicle.

24. The method of claim 19, wherein the step of communicating the first threat vector further comprises communicating the first threat vector and the one or more primary attributes to the second vehicle.

25. The method of claim 19, wherein the primary attributes further comprise one or more of threat identification number, type of the moving object, location of the first moving object, direction of movement of the first moving object and an estimated or observed speed of the first moving object.

26. The method of claim 19, further comprising communicating the first and the second threat vectors to at least a third vehicle in the cluster of vehicles.

27. The method of claim 19, wherein the cluster of vehicles comprises a plurality of vehicles approaching the first location during a first time interval.

* * * * *